US010533645B2

(12) United States Patent
De Freitas et al.

(10) Patent No.: US 10,533,645 B2
(45) Date of Patent: Jan. 14, 2020

(54) DUAL-CAVITY TOROIDAL VARIATOR

(71) Applicant: ALLISON TRANSMISSION, INC., Indianapolis, IN (US)

(72) Inventors: Andrew De Freitas, Wigan (GB); Brian Dutson, Manchester (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 844 days.

(21) Appl. No.: 14/373,963

(22) PCT Filed: Jan. 23, 2013

(86) PCT No.: PCT/EP2013/051258
§ 371 (c)(1),
(2) Date: Jul. 23, 2014

(87) PCT Pub. No.: WO2013/110670
PCT Pub. Date: Aug. 1, 2013

(65) Prior Publication Data
US 2015/0011357 A1 Jan. 8, 2015

(30) Foreign Application Priority Data
Jan. 23, 2012 (GB) .................. 1201068.2

(51) Int. Cl.
F16H 15/38 (2006.01)
F16H 15/40 (2006.01)
(52) U.S. Cl.
CPC ............ F16H 15/40 (2013.01); F16H 15/38 (2013.01); F16H 2015/383 (2013.01); Y10T 29/49826 (2015.01)

(58) Field of Classification Search
CPC ..... F16H 15/38; F16H 15/40; F16H 2015/383
(Continued)

(56) References Cited

U.S. PATENT DOCUMENTS 2,073,134 A * 3/1937 Almen .................. F16H 15/38
476/1
2,123,006 A * 7/1938 Hayes .................. F16H 15/38
192/69.8
(Continued)

FOREIGN PATENT DOCUMENTS

EP 0207184 A1 1/1987
EP 0914573 A1 5/1999
(Continued)

OTHER PUBLICATIONS

UK Search Report, Application No. GB1201068.2 dated May 30, 2012.
(Continued)

Primary Examiner — William C Joyce
(74) Attorney, Agent, or Firm — Taft Stettinius & Hollister LLP; Stephen F. Rost

(57) ABSTRACT

A dual-cavity toroidal variator is disclosed herein. The torques from the first and second cavities are balanced by controlling each roller with mechanical devices rather than individually controlling each roller with a hydraulic actuator. The mechanical devices may be balancing mechanisms having a pivotable linking lever (66) by which the roller carrier (40) of the first cavity and the roller carrier (41) of the second cavity are linked.

15 Claims, 9 Drawing Sheets

(58) Field of Classification Search
USPC .............................................. 476/40, 42, 46
See application file for complete search history.

(56) References Cited

U.S. PATENT DOCUMENTS

| | | | | |
|---|---|---|---|---|
| 3,203,267 | A | * | 8/1965 | De Brie Perry ........ F16H 15/38 476/40 |
| 3,371,546 | A | * | 3/1968 | Spangler ................. F16H 15/38 476/10 |
| 3,394,617 | A | | 7/1968 | Dickenbrock |
| 4,159,653 | A | * | 7/1979 | Koivunen ............... F16H 15/38 476/1 |
| 4,339,966 | A | | 7/1982 | Kraus |
| 5,720,633 | A | * | 2/1998 | Krivec ................... H01R 11/24 439/482 |
| 2004/0023753 | A1 | | 2/2004 | Ervin |
| 2006/0189435 | A1 | | 8/2006 | Flaig et al. |
| 2008/0305920 | A1 | | 2/2008 | Nishii |
| 2010/0197448 | A1 | | 8/2010 | Hoffman |

FOREIGN PATENT DOCUMENTS

| | | | |
|---|---|---|---|
| EP | 1156238 | A1 | 11/2001 |
| EP | 1316744 | A2 | 6/2003 |
| EP | 1826460 | A1 | 8/2007 |
| EP | 1846672 | A | 10/2007 |
| EP | 2054643 | A | 5/2009 |
| GB | 410150 | A | 5/1934 |
| GB | 2360072 | A | 9/2001 |
| GB | 2455337 | A | 6/2009 |
| GB | 2499704 | A | 8/2013 |
| JP | H09/324841 | A | 12/1997 |
| JP | 2000/046145 | A | 2/2000 |
| JP | 2003/307262 | A | 10/2003 |
| WO | 2006/084905 | A1 | 8/2006 |
| WO | 2008/017881 | A1 | 2/2008 |
| WO | 2008/038043 | A2 | 4/2008 |
| WO | 2008/120687 | A1 | 10/2008 |
| WO | 2006/131778 | A1 | 11/2008 |
| WO | 2010/070341 | A1 | 6/2010 |
| WO | 2013/104727 | A1 | 7/2013 |
| WO | 2013/104731 | A1 | 7/2013 |
| WO | 2013/104733 | A1 | 7/2013 |
| WO | 2013/110920 | A1 | 8/2013 |

OTHER PUBLICATIONS

International Search Report and Written Opinion, Application No. PCT/EP2013/051258 dated May 8, 2013.
International Preliminary Report on Patentability, Application No. PCT/EP2013/051258 dated May 15, 2014.
Potentially related application, U.S. Appl. No. 14/373,970, filed Jul. 23, 2014, published as WO2013/110920 on Aug. 1, 2013.
Potentially related application, U.S. Appl. No. 14/371,570, dated Jul. 10, 2014, published as WO2013/104727A1.
Potentially related application, U.S. Appl. No. 14/731,582, filed Jul. 10, 2014, published as WO2013/104731A1, on Jul. 18, 2014.
United Kingdom Intellectual Property Office Examination Report for Application No. GB1414957.9 dated Oct. 13, 2014.
United Kingdom Intellectual Property Office Examination Report for Application No. GB1414957.9 dated Mar. 20, 2015.
United Kingdom Intellectual Property Office Examination Report for Application No. GB1414957.9, dated Oct. 8, 2015.
Indian Office Action, Intellectual Property India, Indian Patent Application No. 5865/CHENP/2014, dated Jul. 30, 2019, 6 pages.

* cited by examiner

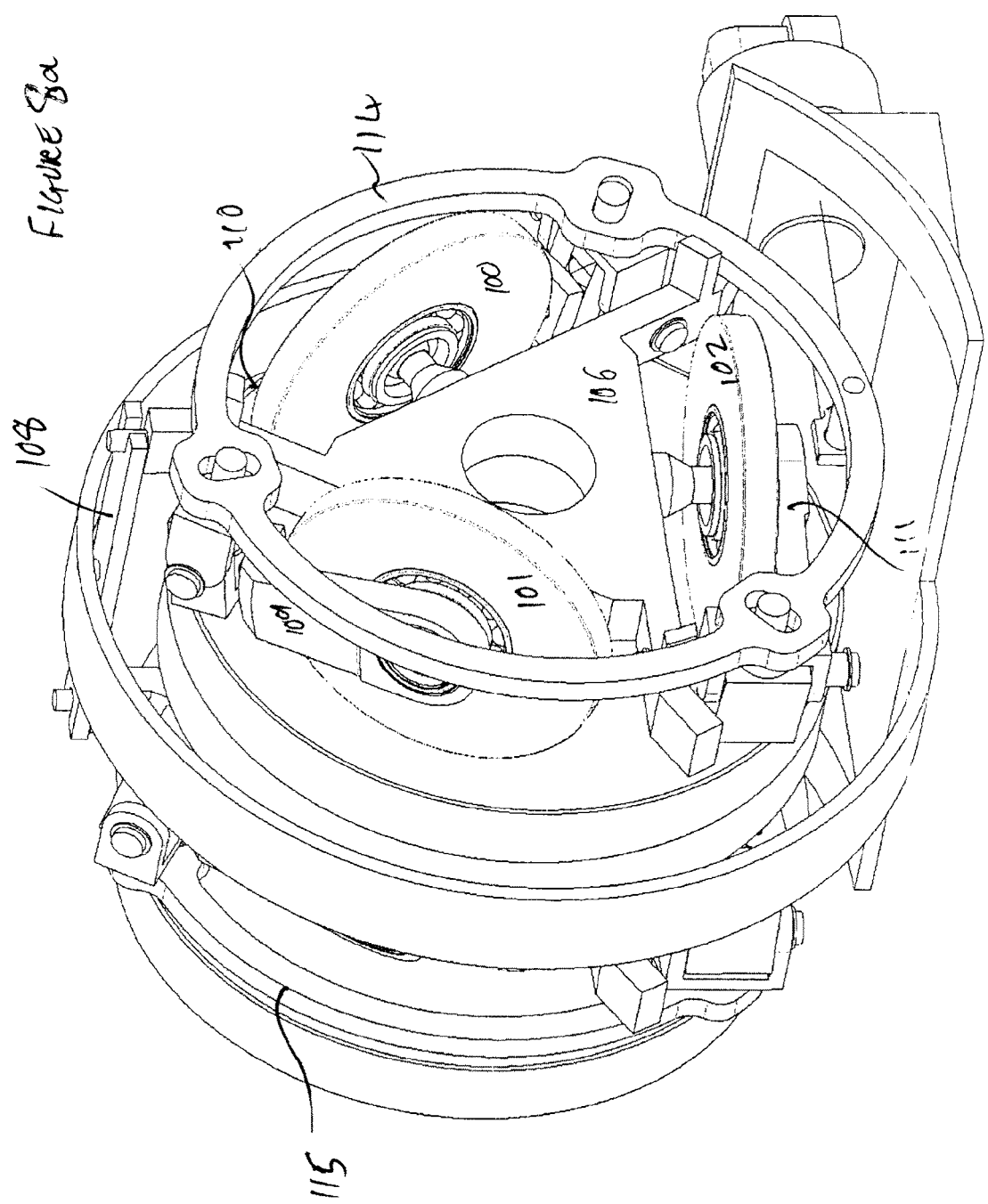

DUAL-CAVITY TOROIDAL VARIATOR

BACKGROUND OF THE INVENTION

This invention relates to a variable ratio transmission apparatus of the toroidal race rolling type, hereinafter referred to as a variator. In particular, this invention relates to a variator having a dual toroidal cavity each cavity having a plurality of rollers wherein the rollers are mechanically linked.

BRIEF SUMMARY OF THE INVENTION

A variator typically comprises a toroidally-recessed input race or disc and a toroidally-recessed output race or disc arranged coaxially about an axis, known as the variator axis, the input disc being mounted for rotation on or with an input shaft. A plurality of rolling elements is provided in the toroidal cavity defined between the input and output disc and power is transmitted from the input disc to the output disc by means of the rollers. The rollers are mounted in roller carriages which are subjected to control forces for example by means of double-acting hydraulic pistons. The rollers exert a tangential force to both the input and output discs, thereby imparting torques to the discs. The sum of the input and output torques may be termed the "reaction torque".

The use of the terms "input" and "output" to define the discs should be taken as a functional or structural limitation relating to these components they are simply labels. These will typically be chosen to provide a concise and understandable description in a particular context. The variator may be symmetrical in operation in that power may flow in either direction through the variator depending on the particular use. For example, in the case of transmission for a vehicle, the input will typically be connected to a prime mover, and the output will typically be connected to a final drive system to indicate the normal direction of power flowing through the variator. However, it will be understood that when the vehicle is in an overrun condition, engine braking will actually cause power to flow from the output to the input of the variator.

An axial force, commonly known as an end-load, is applied to ensure that the rolling elements are urged into contact with the input and output discs, thereby causing a normal contact force to be generated at the interfaces between the rollers and the discs usually by way of an intervening thin film of fluid, to enable traction drive. It is known in the art that the input disc and output disc may make slight axial movements in response to the end-load, the rollers being arranged to accommodate this movement. Typically, the end-load is optimised so that it is high enough to ensure adequate traction at the disc-roller contacts, but low enough to provide a good level of efficiency and durability. In order to achieve this objective, it is important that the normal contact load and individual roller control forces are regulated within precise margins. In variators with two or three rollers per cavity, the contact normal loads for each roller are well defined as the roller load bearing structure is statically determinate. Ensuring that the roller control forces are equal is typically ensured through use of hydraulic roller control actuators, whereby equal pressure is fed to all actuators.

A toroidal variator may be used in a wide range of applications including those requiring a high power density for example vehicle main-drive transmissions and in auxiliary drives, and lower power density applications for example in lawn mowers. Conventionally, in order to be able to transmit the required levels of power with the required level of mechanical efficiency, especially in high power density applications, a variator having dual toroidal cavities defined between two input discs and the output disc, with a set of two, three or more rollers per cavity may be employed. Each set of rollers may have an independent roller control mechanism. The cost and complexity associated with dual-cavity variators is correspondingly greater than with a single toroidal cavity variator. Further, such variators are complex, the size of the variator housing required to accommodate the individual control mechanisms may be unduly large and the exterior shape may be undesirable with parts protruding from the housing at undesirable angles. This may give rise to packaging challenges when incorporating the variator into applications such as vehicle main drive transmissions and auxiliary drives.

There is a need to provide a simplified, dual-cavity variator suitable for use in lower cost applications.

For efficient operation, the torque handled by the two cavities in a dual-cavity variator should, as nearly as possible, be equal. Even where the carriers of the two cavities are controlled from a common hydraulic source, the torque handled by the two cavities can differ due to the physical differences in components of the two cavities arising from manufacturing tolerances. The present invention provides a way of ensuring that roller control forces within each cavity are closely equal to one another whilst also providing a mechanism for balancing the torques from the first and second cavities, but with reduced cost and complexity compared to conventional dual toroidal cavity variators which typically require independent control of each roller and without the cost associated with increased accuracy in manufacture. By controlling each roller with mechanical means rather than individually controlling each roller with a hydraulic actuator, we have found that the complexity and cost of a dual-cavity variator may be reduced whilst maintaining its requiring high power density characteristics.

The invention provides in a first aspect, a variator comprising a first input surface and a first output surface defining a first toroidal cavity and being coaxially mounted for rotation about a variator axis and a first plurality of rollers in driving engagement with the first input and first output surfaces; a second input surface and a second output surface defining a second toroidal cavity and being coaxially mounted for rotation about the variator axis and a second plurality of rollers in driving engagement with the second input and second output surfaces; and a control assembly on which the rollers in the first cavity and the rollers in the second cavity are rotatably mounted and which assembly is adapted to balance the reaction torque from the first cavity with the reaction torque from the second cavity.

Advantageously, variators embodying the invention are less complex and less costly than dual cavity variators in which each roller is controlled independently. Such variators also provide a more compact exterior size and shape, facilitating its use in applications where space may be at a premium, for example in small vehicle applications. Embodiments of the invention may provide a dual cavity variator which is more economic to manufacture and assemble as compared to known dual cavity variators and may be beneficially and economically employed in lower cost applications. A variator embodying the invention also provides for balancing of reaction torque from the two cavities enabling improved efficiency and durability of the variator. The size of a variator embodying the invention and undesirable protrusions from the variator housing may also be reduced by virtue of fewer actuators being required and greater flexibility in locating the control assembly may be afforded.

In typical embodiments, the control assembly between the rollers in the first cavity and the second cavity equalizes the reaction torque from the rollers in the first cavity with that from the rollers in the second cavity. The control assembly may comprise a first roller carrier upon which the plurality of rollers in the first cavity are rotatably mounted, a second roller carrier upon which the plurality of rollers in the second cavity are rotatably mounted, a mechanical linkage between the first and second carriers. The control assembly may further comprise an actuator for the mechanical linkage. Advantageously, the control assembly equalizes the reaction torque by causing the mechanical linkage to impart movement to the roller carriers in a direction generally orthogonal to the line of action of the force applied by the input and output surfaces to the rollers and generally orthogonal to the variator axis. The movement may follow a curved path or have some non-orthogonal component. In this way, forces arising from actuation of the variator do not impinge upon the sensed reaction loads from each cavity. Load balancing is achieved by the load sensed by the control assembly independently of any actuating force, and equally effectively in embodiments that do not have any such actuating force (typically, ratio-controlled embodiments).

The input and output surfaces defining the first and second toroidal cavities are suitably formed on input and output discs respectively. The first and second output surfaces of the variator suitably face away from each other and are both disposed between the first and second input surfaces. The first and second output surfaces may be formed on opposite sides of a single disc or may be formed on separate discs which are mounted "back-to-back" for rotation coaxially with the variator input shaft. Where the output surfaces are formed on separate discs, an output drive may suitably be mounted coaxially with and between the separate output discs for coaxial rotation therewith. The output drive may have a different diameter to the output discs. Where a single output disc is employed, it suitably comprises an output drive on its circumferential surface. Preferably the output drive is selected from a pulley, a gear and a sprocket. The circumferential surface of the output disc may comprise teeth defining an output drive. The output drive is typically connected to transmit drive to a take-off. The output drive and take-off drive may be intermeshing gears or may comprise sprockets linked by a chain, a belt or any other means for transferring drive.

The control assembly suitably comprises a first roller carrier which carries the plurality of rollers in the first cavity, a second roller carrier which carries the plurality of rollers in the second cavity and a mechanical linkage between the first and second roller carriers whereby the reaction torque of the rollers may be balanced. The rollers are rotatably mounted on the first and second carriers. The term "carrier" is employed herein to mean a component which carries two or more rollers as in the present invention. The term "carriage" as employed herein, and as is conventional in the art, refers to a part which carries a single roller. Suitably, the control assembly controls the load applied to all the rollers simultaneously.

The mechanical linkage is suitably mounted for rotation about a pivot point. The mechanical linkage preferably comprises a pivotally mounted lever operatively coupled to the first and the second roller carrier. The mechanical linkage suitably spans the two toroidal cavities.

The control assembly suitably enables the reaction torque of the first and second toroidal cavities to be balanced or equalized utilising the mechanical linkage between the roller carriers. Where the torques are not reacted equally, forces applied by the carriers to the mechanical linkage will be unequal. This will move to cause the torque to be redistributed until balance is restored between the reaction torque from the rollers in the first cavity and the reaction torque from the rollers in the second cavity, and there is no unbalanced force on the linkage. Each roller experiences a control force that is reacted back to its carrier, this force being dependent on the roller's position, tilt, disc-roller contact normal load and the input and output surface speeds. If any roller control force on a carrier is not equal in magnitude to each of the other roller control forces on the same carrier, the carrier may translate radially within the toroidal cavity to equalize the roller control forces within that cavity. The action of roller load equalization within a cavity, together with balancing or equalization of the reaction torques from each cavity ensures that all roller control forces in the variator may be equalized or controlled within precise margins. The load balancing mechanism provided by the carrier assembly allows wider manufacturing tolerances of component parts in manufacture, thereby reducing cost and easing assembly.

The variator may be torque controlled or by ratio controlled.

A ratio controlled variator receives a control signal indicating a required speed ratio, and is constructed to adjust the orientation of the rollers in response to the control signal such that the desired ratio is achieved. The rollers may be oriented to a different position to provide the desired speed ratio for example by tilting the rollers. The variator suitably comprises a control input for the rollers in the first toroidal cavity and/or the second toroidal cavity and means for sensing a reaction torque in the first roller carrier and second roller carrier and means for modifying the control input in response to the difference between the two reaction torques sensed through the means for sensing the reaction torque. The control input suitably comprises an external input to the roller carriers separately from the mechanical linkage, to provide the desired drive ratio. The input to the carriers may comprise input exclusively from the external input or comprise input from the external input and from the mechanical linkage. The mechanical linkage acts as the sensing means to provide information from which the external input to the carriers may be derived.

In one embodiment of "ratio control", the plurality of rollers within one of the cavities is controlled by a control member. Suitably, at least one control member is operatively coupled to the plurality of rollers on the same side of a plane that passes through the variator axis. Where there are a plurality of control members, it is further preferred that all the control members are located on the same side of a plane that passes through the variator axis. Suitably the control member imparts a component of rotation to the rollers about an axis through the roller centre and parallel to the variator axis such that the rollers pitch to a new inclination. The axis of rotation of the roller is thereby moved away from intersection with the variator axis and the roller seeks to steer to a new speed ratio by rotating about an axis through the roller centre and parallel with the plane through the toroidal cavity and where the axis of rotation of the roller again intersects the variator axis, thereby providing a new stable inclination for the roller at a different speed ratio.

In this mode of operation, referred to as "tilt steer", the invention advantageously enables the control member to be actuated using relatively low power. The invention further provides a variator having a control member which is capable of actuation at a power of less than 25 Watts, preferably less than 20 Watts, especially less than 10 Watts and desirably less than 5 Watts.

In a torque controlled variator a signal is provided indicating a required variator reaction torque, this being the sum of the torques at the input and output of the variator. Reaction torque is the net torque tending to rotate the variator discs, and this torque must also be reacted back to the variator housing. The variator accommodates ratio changes arising from acceleration or deceleration of the engine or vehicle independently of the reaction torque. The first roller carrier, second roller carrier and preferably both roller carriers are suitably each pivotally mounted about their own fulcrum or pivot point and the mechanical linkage is able to act on both roller carriers such that they pivot about their respective pivot points. Suitably, each of the carriers is pivotally mounted with a pivoting axis substantially parallel to the variator axis, and at right-angles to the principle pivoting point of the mechanical linkage. The mechanical linkage is mounted for movement in a direction which is substantially parallel to a tangent to the variator discs. The control assembly suitably comprises an actuator to move the mechanical linkage in a direction which is substantially parallel to a tangent to the variator discs. Preferably, the actuator acts on the mechanical linkage.

The actuator for the mechanical linkage may be single-acting or double-acting and is preferably double-acting. The actuator may be controlled by conventional means, for example hydraulically or electrically.

Both torque and ratio controlled variators suitably comprise at least one limiting mechanism for the control assembly. The term "limiting mechanism" as employed herein means a component which limits the travel of a mechanical component, for example the mechanical linkage of the control assembly, thereby providing an end-stop.

In the case of the torque controlled variator, the movement of the control assembly in a direction which is substantially parallel to a tangent to the variator discs is suitably limited by a limiting mechanism acting on the mechanical linkage or on the actuator. In a preferred embodiment, the actuator comprises an end-stop, preferably a mechanical end-stop, which acts on either or both ends of a piston of a hydraulic actuator. Advantageously, any torques generated due to contact between the mechanical linkage against the limiting mechanism are borne evenly by the rollers in the first and second cavities.

The following descriptions apply to both torque and ratio controlled variators.

A limiting mechanism is suitably provided to act on the mechanical linkage to limit its rotational movement about the pivot point thereby providing a rotational end-stop. Limitation of the rotational movement of the mechanical linkage in the control assembly enables any large differences between carrier torques due to adverse effects of mechanical, hydraulic or other component failures to be reduced. Advantageously, any torques generated due to contact between the mechanical linkage against the limiting mechanism are borne evenly by the rollers in the first and second cavities.

Suitably, the control assembly is mounted for radial float in order that loads between rollers within each of the first and second cavities may be balanced. Suitably, the first and/or second roller carrier is movable radially with respect to the variator axis for example as described in EP-A-1846672. In another embodiment the carrier is movable in a non-radial direction as well as a radial direction, for example as described in EP-A-2054643. The carrier for each group of rollers preferably comprises a pivot pin which is displaceable along a slot which extends in the radial direction relative to the variator axis. The diameter of the pivot pin is preferably substantially the same as the width of the slot, whereby the pivot pin is constrained to move in the longitudinal direction of the slot. In another embodiment, the pivot pin may be mounted in a slider block which is movable along the slot whereby the carrier may move in a direction having an exclusively radial component and also in a direction having both a radial and non-radial component. Preferably, the pivotal axis is movable through a predetermined distance in the said radial direction.

The carrier in either or both cavities may move in a radial direction or move in a direction having a radial and non-radial component to equalize roller control forces within each cavity.

Suitably, the first roller carrier and the second roller carrier each have a limiting mechanism. These limiting mechanisms suitably comprise a slot of limited and defined length in the housing of the variator in which the carrier fulcrum locates. Alternatively, the limiting mechanism may comprise a mechanical end-stop that is independent of the slot in the housing.

In a preferred embodiment, both the first roller carrier and the second roller carrier comprise a limiting mechanism and the mechanical linkage comprises a limiting mechanism to limit its movement in the direction tangential to the discs and also a limiting mechanism to limit its rotation about its pivot point. Provision of a limiting mechanism for either or both the carriers advantageously provides enhanced robustness of the variator.

Suitably, each of the limiting mechanisms, whether for the mechanical linkage, actuator, the first roller carrier or second roller carrier, is a mechanical end-stop, for example a lug.

The control assembly preferably comprises a damper. The damper suitably acts to dampen the motion of the control assembly, preferably the motion of the mechanical linkage in order to reduce hunting of the control assembly.

Damping means acting in the radial direction of carrier motion may also be employed in order to reduce hunting of the carrier.

The first and second toroidal cavities suitably are a full toroidal cavity.

Variators that transfer power from the output drive, typically an output disc or a separate gear, to a take-off drive, for example a layshaft parallel to the variator axis, are known to suffer from variator structural bending due to radial loads that are imparted to the variator output drive by the layshaft take-off device for example a gear, a belt or a chain. Such deflection of the variator structure may result in unequal contact normal loads on different rollers. This problem may be addressed by providing a variator output drive support, but this may add weight, or be expensive or impractical due to packaging limitations.

We have now found that this drawback may be ameliorated by mounting the rollers within the cavities in a particular geometry.

The invention further provides a variator comprising a first input surface and a first output surface defining a first toroidal cavity and being coaxially mounted for rotation about a variator axis and a first plurality of rollers in driving engagement with the first input and first output surfaces; a second input surface and a second output surface defining a second toroidal cavity and being coaxially mounted for rotation about the variator axis and a second plurality of rollers in driving engagement with the second input and second output surfaces; and a control assembly on which the rollers in the first cavity and the rollers in the second cavity are rotatably mounted and which assembly is adapted to balance the reaction torque from the first cavity with the reaction torque from the second cavity, an output drive and a take-off drive operably coupled with the output drive to transmit drive, the take-off drive being mounted radially from, and parallel to the variator axis, the rollers being mounted such that all the roller-disc contacts at one particular ratio within the operating range of the variator lie substantially in a plane that passes through the variator axis and is generally perpendicular to the radial force imparted to the output drive by the take off drive.

By mounting the rollers such that roller-disc contacts at one particular ratio within the operating range of the variator lie substantially in a plane that passes through the variator axis and is generally perpendicular to the radial force imparted to the output drive by the take off drive, the roller contacts will substantially lie on the neutral axis of bending of the variator structure thereby ensuring that the normal contact loads of all the rollers are substantially equal and substantially unaffected by any variator deflection. Advantageously, this improves roller durability and ensures a satisfactory traction safety margin at all roller-disc contacts whilst achieving a good level of efficiency.

Preferably, the mechanical linkage of the control assembly comprises a linking lever which pivots about a point located on a line passing through a point of meshing of the output drive and take-off drive and which is perpendicular to and passes through the variator axis.

In a preferred embodiment, the variator of the invention comprises two and only two rollers in the first cavity and a plurality of rollers, especially two and only two rollers in the second cavity.

A variator embodying the invention is suitably a component in a transmission system that transmits power from a prime mover to a driven system, and from another aspect, the present invention provides such a transmission system. The driven system may be a main drive system for a vehicle. Such a drive system may include a single prime mover, such as an internal combustion engine. Alternatively, the drive system may include a plurality of prime movers, such as in a hybrid drive system. In such a configuration, the prime movers typically include an internal combustion engine and an electric motor. The drive system may further include a kinetic-energy recovery system that can store and recover energy from the or each prime mover.

The variator of the present invention also lends itself to modular assembly by allowing the first and second plurality of rollers mounted on their respective carriers to be inserted between the input and output discs as they are assembled. The mechanical linkage between the carriers may then be attached to a casing of the variator as a final operation.

Suitably, driving engagement between the discs and the rollers is through a traction fluid.

In a further aspect, the invention provides a method of assembling a variator comprising providing a rotatable shaft defining a variator axis, mounting for rotation on the shaft a first input surface, locating a first carrier comprising a first plurality of rotatable rollers adjacent to the first input surface, mounting for rotation about the variator axis a first output surface to define a first toroidal cavity and a second output surface, locating a second carrier comprising a second plurality of rotatable rollers adjacent to the second output surface, mounting for rotation about the variator axis a second input surface defining with the second output surface a second toroidal cavity, pivotally mounting a mechanical linkage to operatively engage with the first and second carriers to provide a control assembly for the rollers.

BRIEF DESCRIPTION OF THE DRAWINGS

Embodiments of the invention are illustrated in the accompanying figures in which:

FIGS. 8*a* to 8*c* show a perspective view, end elevation and side elevation of a further variator embodying the invention having three rollers per cavity.

DETAILED DESCRIPTION OF THE DRAWINGS

Figure 1:
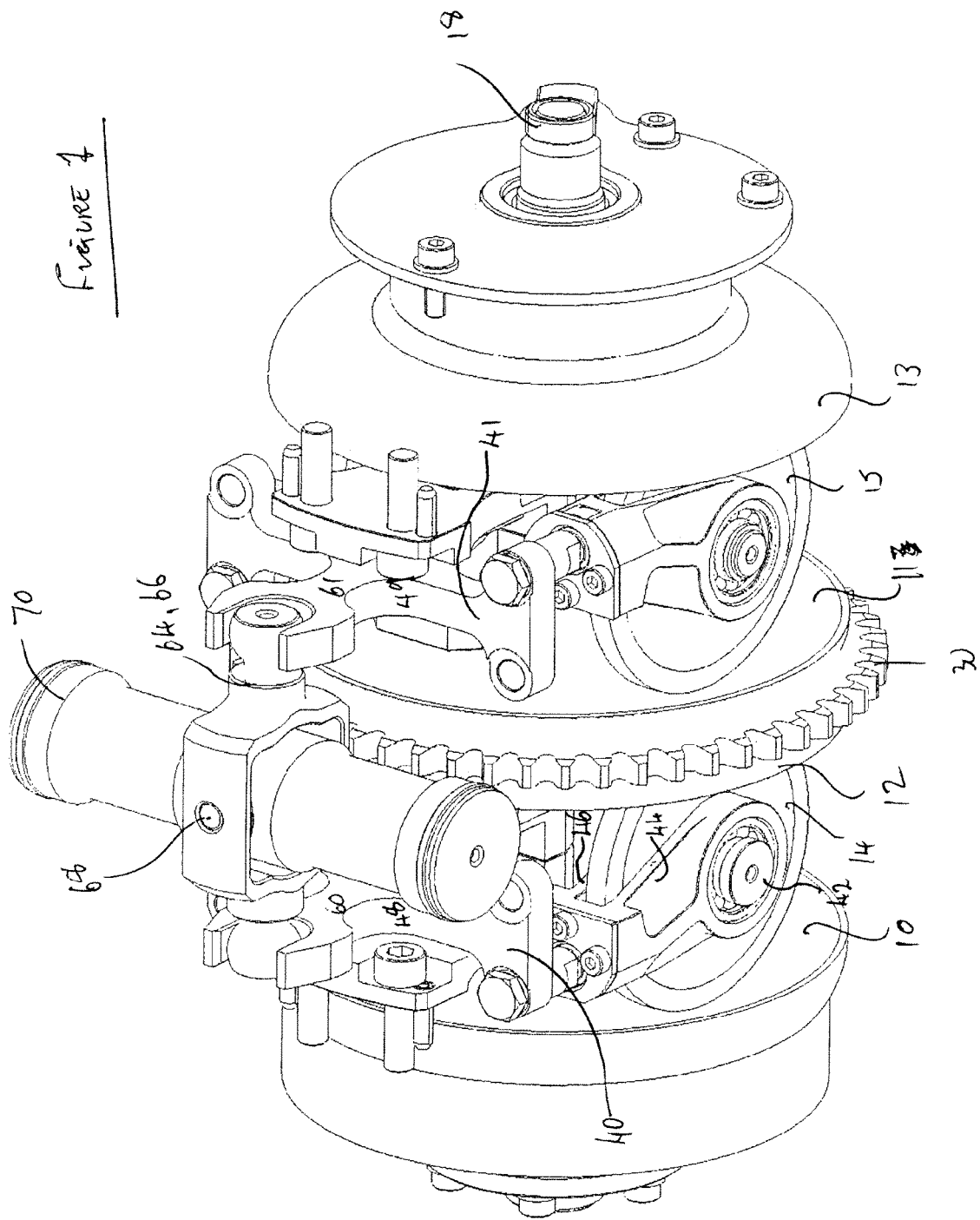
FIG. 1 shows a perspective view of a variator according to the invention.
Figure 2:
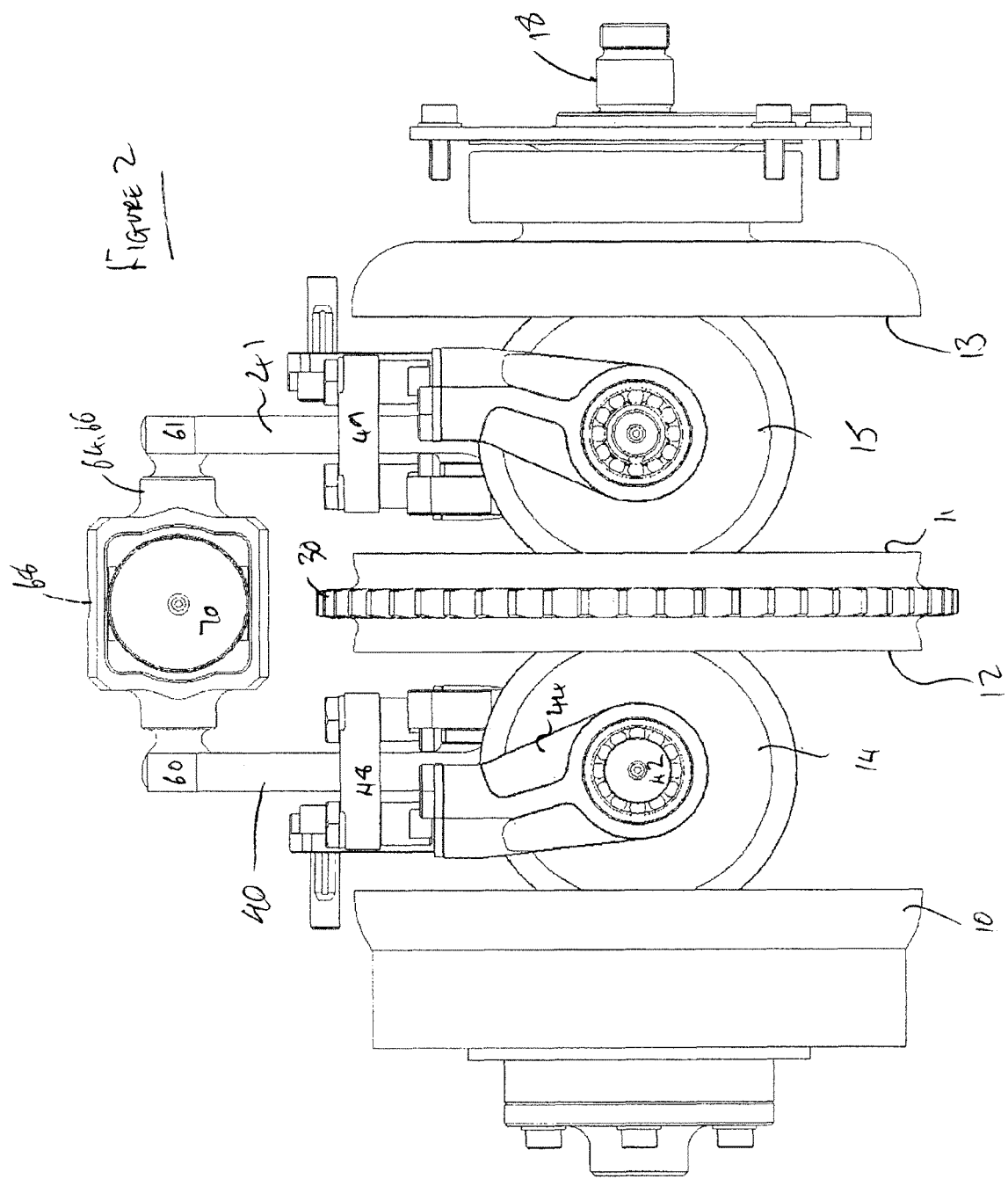
FIG. 2 shows a side elevation view of the variator shown in FIG. 1.
Figure 3:
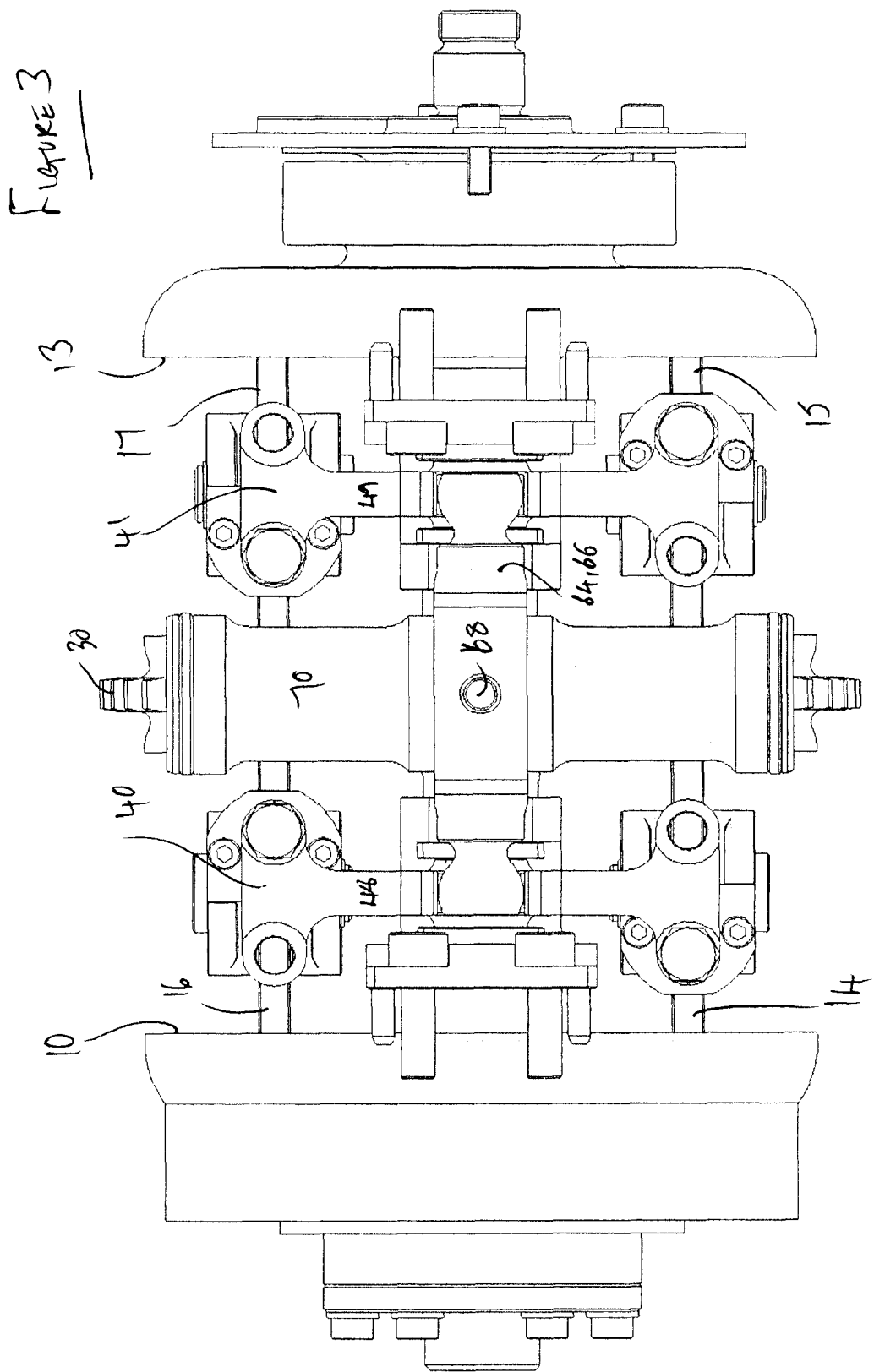
FIG. 3 shows a top elevation view of the variator shown in FIG. 1.
Figure 4:
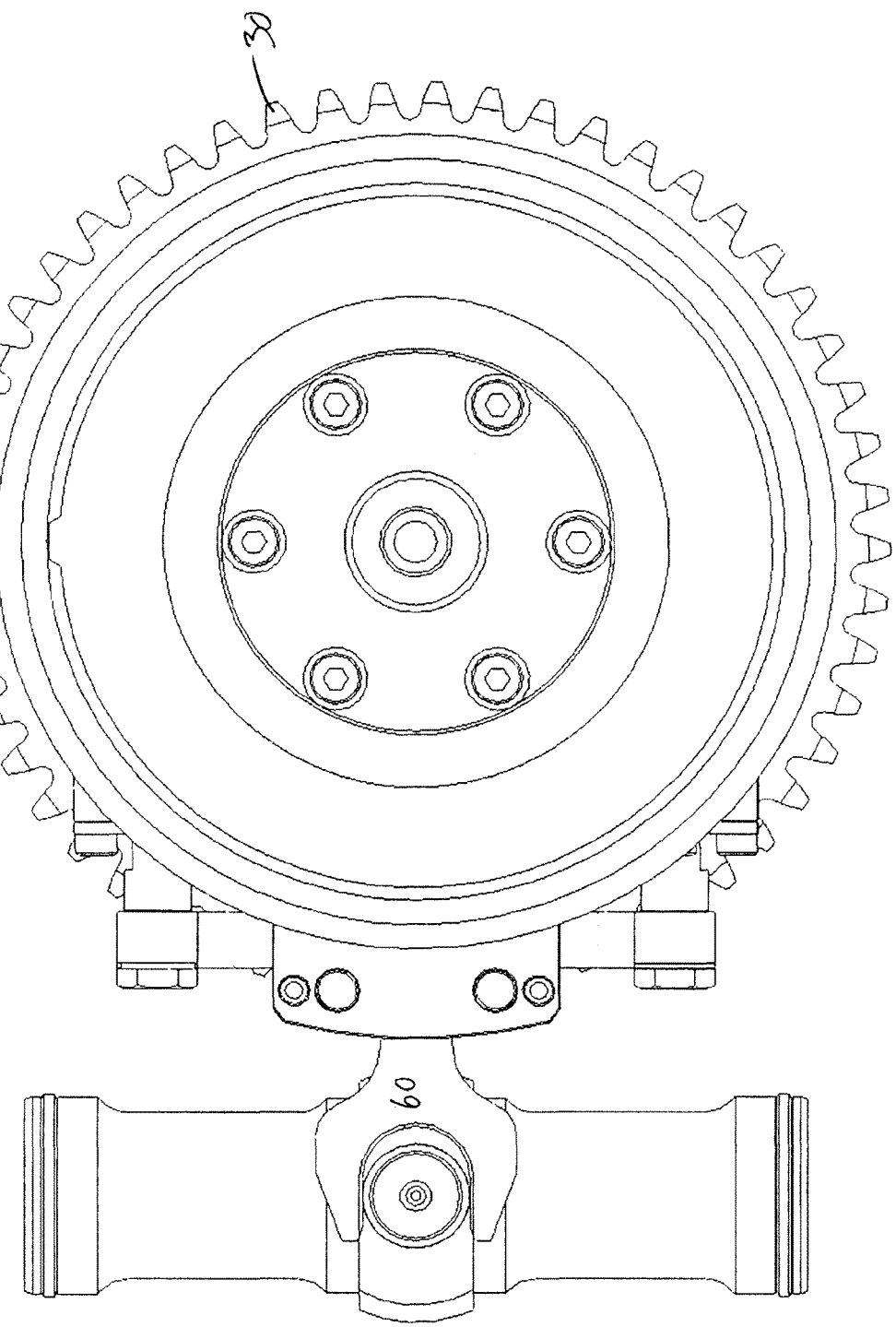
FIG. 4 shows an end elevation view of the variator shown in FIG. 1.

The variator illustrated in FIGS. 1 to 6 is a torque-controlled variator being an embodiment of the invention. The variators illustrated in FIGS. 7 and 8*a* to 8*c* are ratio controlled variators being further embodiments of the invention.

A continuously variable ratio transmission system comprises a variator having a first toroidally-recessed input disc 10 and a facing first toroidally recessed (not shown) output disc 12. The recesses define a full-toroidal cavity between the input disc 10 and the output disc 12. The output disc 12 also has a toroidal recess 11 on its opposite side providing a second toroidally recessed output surface. A second toroidally-recessed input disc 13 is provided, defining a second full-toroidal cavity with the output surface 11. Two rollers 14, 16 are mounted in the first toroidal cavity defined between the opposing toroidally-recessed faces of the input and output discs 10, 12 to transmit drive from the input disc 10 to the output disc 12 with a ratio which is variable by tilting the rollers 14, 16. Two rollers 15, 17 are mounted in the second toroidal cavity defined between the opposing toroidally-recessed faces of the input and output discs 11, 13 to transmit drive from the input disc 11 to the output disc 13 with a ratio which is variable by tilting the rollers 15, 17.

The input disc 10 is connected to, and rotates with, a system input shaft 18. The variator provides an output via an output shaft (not shown) which may be tubular and which is connected to the output disc 12 and arranged coaxially with, and around, the input shaft 18. The output disc 12 having the first output surface and the second output surface provides the output drive of the variator and is mounted on an output shaft.

The transmission is housed in a generally tubular casing (not shown) which supports the outer section of the input shaft. The output shaft is inboard of the casing.

The roller 14 is rotatably mounted in a roller carrier 40. Each roller 14, 16 and 15, 17 is similarly mounted. The roller carrier 40 comprises a roller carriage 44, 46 for roller 14 and a corresponding roller carriage for roller 16 in the first toroidal cavity. Roller carrier 41 comprises similar roller carriages for rollers 15, 17 in the second toroidal cavity. The rollers 14, 16 and 15, 17 are each mounted by means of a stub axle 42 rotatably mounted in a roller carriage defined by opposed planar support plates 44, 46. The mounting of the rollers is numbered only on one roller for illustrative purposes and in the interests of clarity. The rollers are mounted on the carriers 40, 41 via spherical bearings (for example, those commonly known as Rose bearings or Rose joints). The roller carriers 40, 41 each carry two rollers and comprise a respective cross-bar 48, 49 which is pivotally mounted. Cross-bar 48 links the two rollers 14, 16 in the first cavity and cross-bar 49 links the two rollers 15, 17 in the second cavity. The pivot point of each carrier 40, 41 is located mid-way between the centre points of the two spherical bearings which carry the two rollers. Suitably, the pivot point comprises a pivot pin 72 which is mounted in a block 73. The pin 72 is received in a slot 71 of substantially the same width as the diameter of the pivot pin but elongated in the radial direction with respect to the variator axis, such that the pin 72 is a sliding fit within the slot 71. The slot 71 is provided in a mounting lug which projects into the variator into the space between the input and output discs 10, 12 for carrier 40 and 11, 13 for carrier 41. The carriers 40 and 41 pivot about an axis which is parallel to the variator axis.

The cross-bars 48, 49 are each provided with an actuating arm 60, 61 which projects in a radial direction from the variator axis in a direction perpendicular to the axis of the cross-bars 48, 49. An end part of each arm 60, 61 that projects out of the variator housing has the shape of an open-ended spanner for direct mechanical engagement with a mechanical linkage 64.

The mechanical linkage 64 comprises a linking lever 66 mounted for pivoting about a pivot point 68 and is operatively linked to the carriers 40, 41 through the arms 60, 61. The pivot point 68 is carried on an actuator 70 (preferably a double-acting hydraulic actuator) such that the stroke of the cylinder acts to provide a limiting mechanism for travel of the linking lever 66 in the direction parallel to a tangent of the disc 12. The linking lever 66 is movable in a direction perpendicular to the line of the lever 66 and in a line which is parallel to a tangent of the disc 12. The force applied to the linking lever 66 through each arm 60, 61 varies with the reaction force arising from the corresponding cavity. Therefore, if the reaction torques are unequal, the linking lever 66 will be subject to a couple, which couple will cause the linking lever 66 to rotate about its pivot point. The linking lever 66 will continue to rotate until the couple is reduced to zero, at which condition, the reaction torques will be equal. The linking lever 66 enables the reaction torque from one cavity to be balanced or equalized with the reaction torque from the other cavity by rotating about pivot point 68, whereby the ends of the linking lever 66 rotate and move the arms 60, 61 in a plane perpendicular to the variator axis to balance the reaction torques from the cavities. As the linking lever 66 pivots, the point of interconnection with the first roller carrier and second roller carrier moves in a direction that is generally orthogonal to the line of action of the roller contact forces and also generally orthogonal to the variator axis (that is, in the plane of the discs). In this way the force applied by the actuator 70 does not interact with the sensed reaction loads from each cavity, but load balancing is achieved by the pivot purely from sensed load. Suitably, the force applied by the actuator 70 and the sensed reaction loads from each cavity are decoupled. This also means that loads will be balanced by this arrangement even in embodiments that do not incorporate an actuator, such as those shown in FIGS. 7 and 8.

As the cross bars 48, 49 pivot, one of the rollers 14, 15 in each cavity is pushed and the other 16, 17 is pulled, both with equal force. The carriers 40, 41 may move radially away from and toward the variator axis, which ensures that the roller control forces within each cavity are equalized. Limitations associated with practical manufacturing and assembly processes make accurate control of roller positions, and hence disc-roller contact conditions difficult in low cost variators. Therefore force equalization between different rollers is important especially in low-cost assemblies, where the manufacture of the components is likely to be less accurate or where wider tolerances are specified. The radial movement of the pivot of the carriers 40, 41 allows the carriers to move to a position in which a force generated by the different rollers attached to that carrier which arises from manufacturing differences will be reduced and desirably eliminated.

Figure 5:
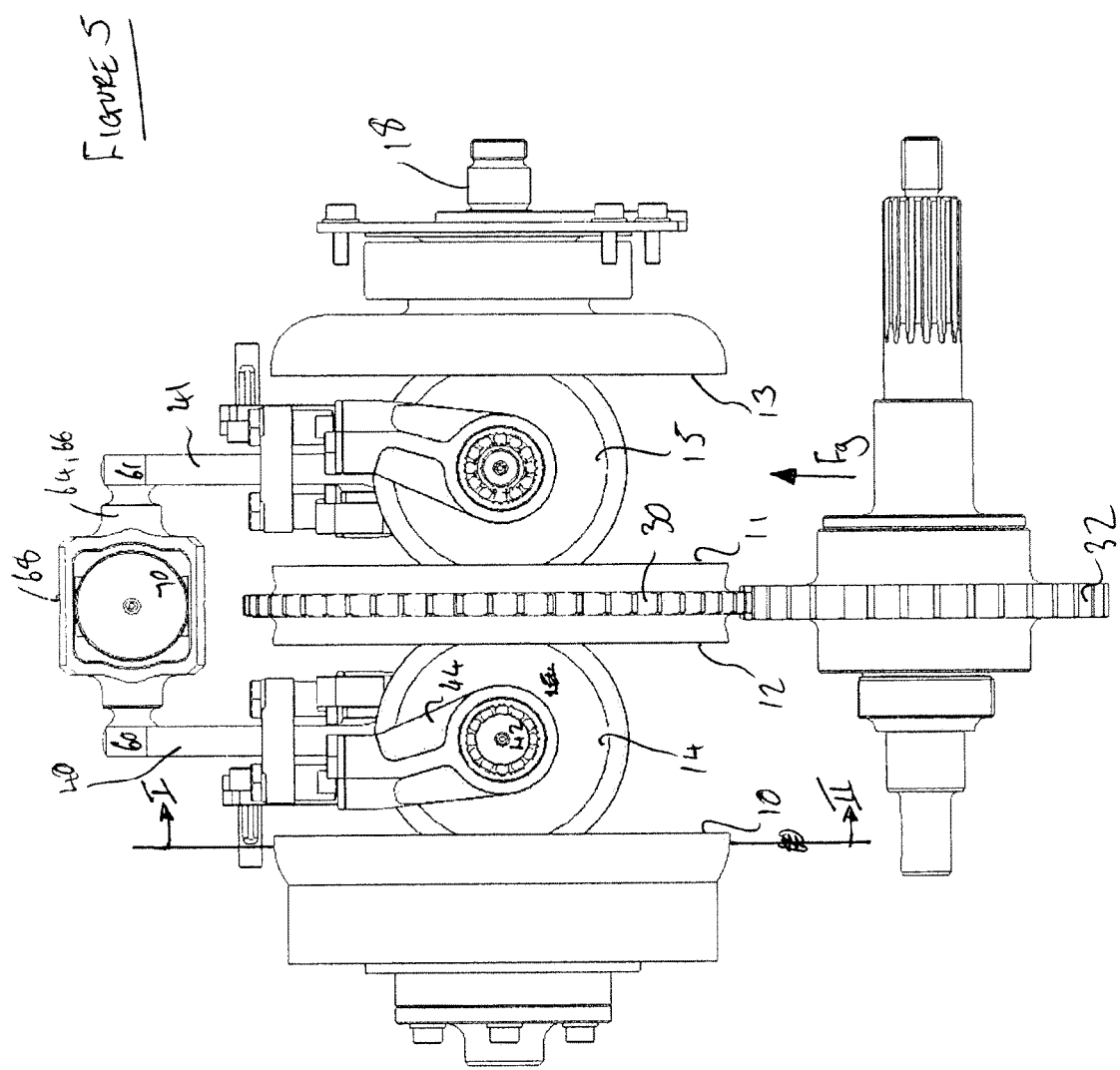
FIG. 5 shows a side elevation view of the variator shown in FIG. 1 with a take-off drive engaged with an output drive of the variator.

The output disc 12 is provided with teeth 30 on the circumferential surface of disc 12 whereby drive may be taken through a take-off drive, for example a gear 32, on a layshaft parallel to the variator axis. A gear force Fg in the direction shown in FIG. 5 is generated which may impart a bending force to the input shaft and cause the more distant parts of the input surfaces 10, 13 to bow or splay away from the output surfaces 12, 11.

In an especially preferred aspect of the invention, the mechanical linkage and carriers for the rollers 14, 16 and 15, 17 are oriented in such a way that the force Fg is perpendicular to a plane through all the roller-disc contact points when the variator is at a −1.0 ratio (the negative value indicating that there is speed reversal between the input and output). With this orientation, the roller-disc contact points are located on the neutral axis of bending of the variator shaft such that the normal contact forces are not substantially affected by the radial force Fg and each roller contact bears an equal proportion of the applied end-load force.

If the roller-disc contacts were orientated away from the plane perpendicular to force Fg, the rollers more distant from the meshing of gears 30 and 32 would be subject to a lesser contact force and those rollers nearer to the meshing gears 30, 32 would experience a higher contact force, presenting imbalance and poorer performance.

Figure 6:
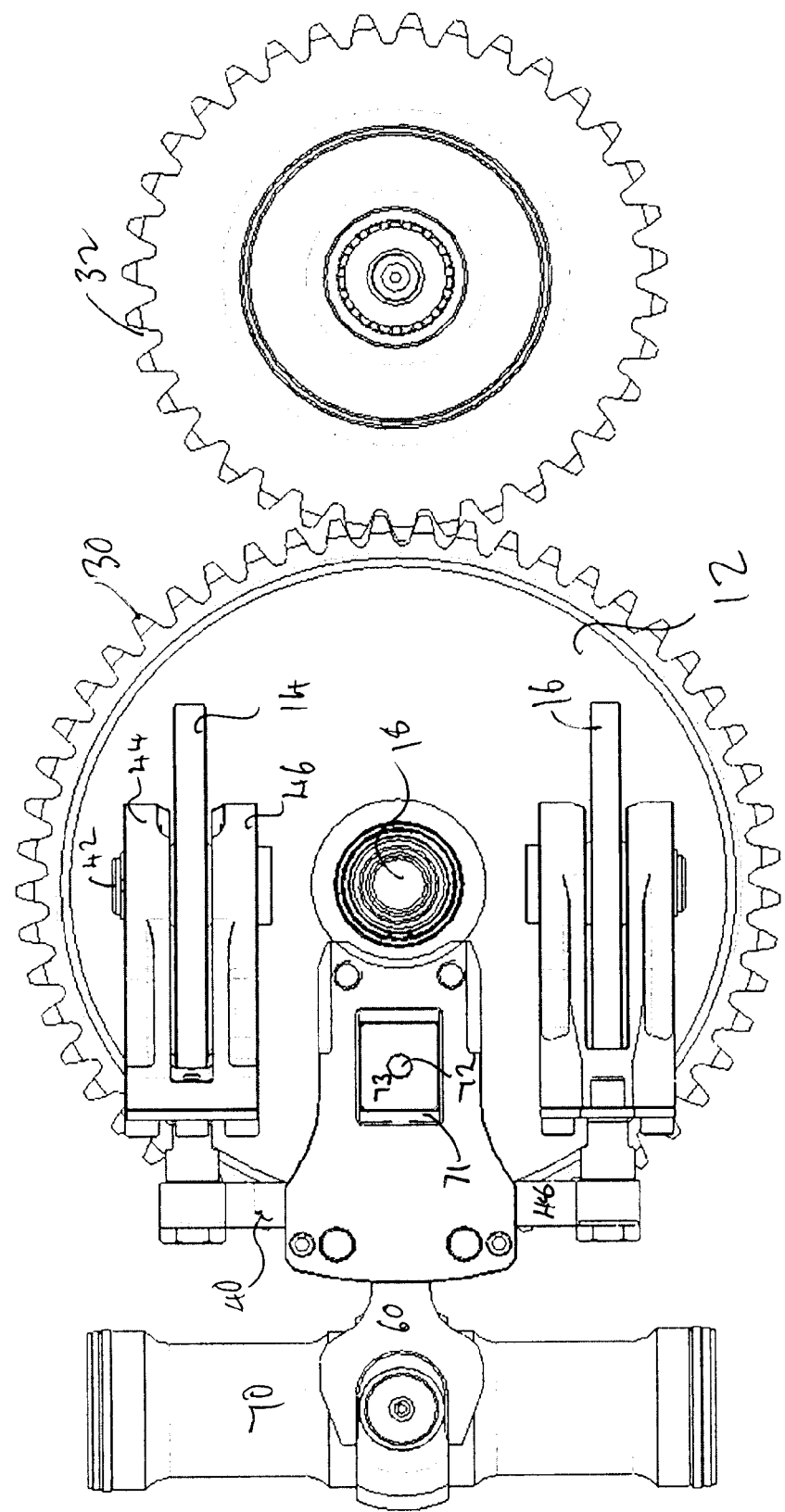
FIG. 6 shows an end elevation view of the variator shown in FIG. 5 about line I-II.

FIG. 6 shows a limiting mechanism of a roller carrier comprising a slot 71 in the carrier 60 and a pin 72 mounted on the housing of the variator and engaged with the slot 71 through a block 73 which is pivotally mounted on the pin 72 and slidable along the slot 71 in a direction which is radial or non-radial relative to the variator axis.

Figure 7:
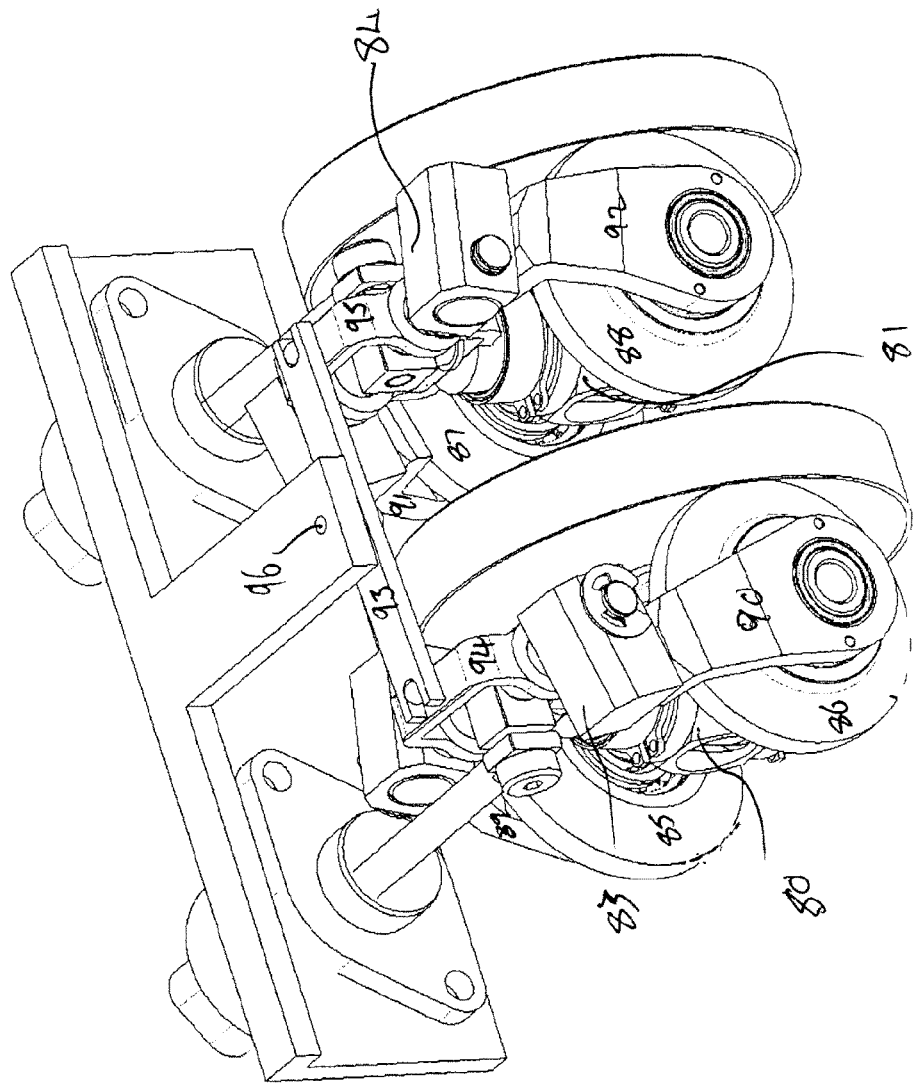
FIG. 7 shows a perspective view of part of another variator embodying the invention in which the rollers are actuated externally by control members.

FIG. 7 shows a part of a twin cavity ratio controlled variator that is an embodiment of the invention. The variator comprises a second input surface and a second facing output surface defining a second toroidal cavity. A first 85, 86 and second 87, 88 set of rollers which are rotatably mounted on respective roller carriages 89, 90, 91, 92 and are free to undergo a tilting motion to change a pitch angle between the axis of the roller and the variator axis. The respective roller carriages are mounted for pivotal movement about an axis passing through the centre of the respective roller.

The variator has a control assembly comprising a linking lever 93 pivotally mounted about point 96 which is operatively coupled to parts 94 and 95 which are mounted on the linking lever 93. Reaction members 80, 81 are provided and are operatively coupled with the rollers such that reaction torque from the roller-disc contacts is reacted to the linking lever 93 through the reaction members 80, 81 and parts 94, 95 whereby the reaction torques from each cavity are balanced, in a manner similar to that in the preceding embodiments. The rollers are operatively coupled to the reaction members 80, 81 by spherical bearings such that the reaction members bear reaction loads arising from the respective rollers.

Each set of rollers is controlled by a control member 83, 84 which is actuated by a control signal.

Figure 8C:
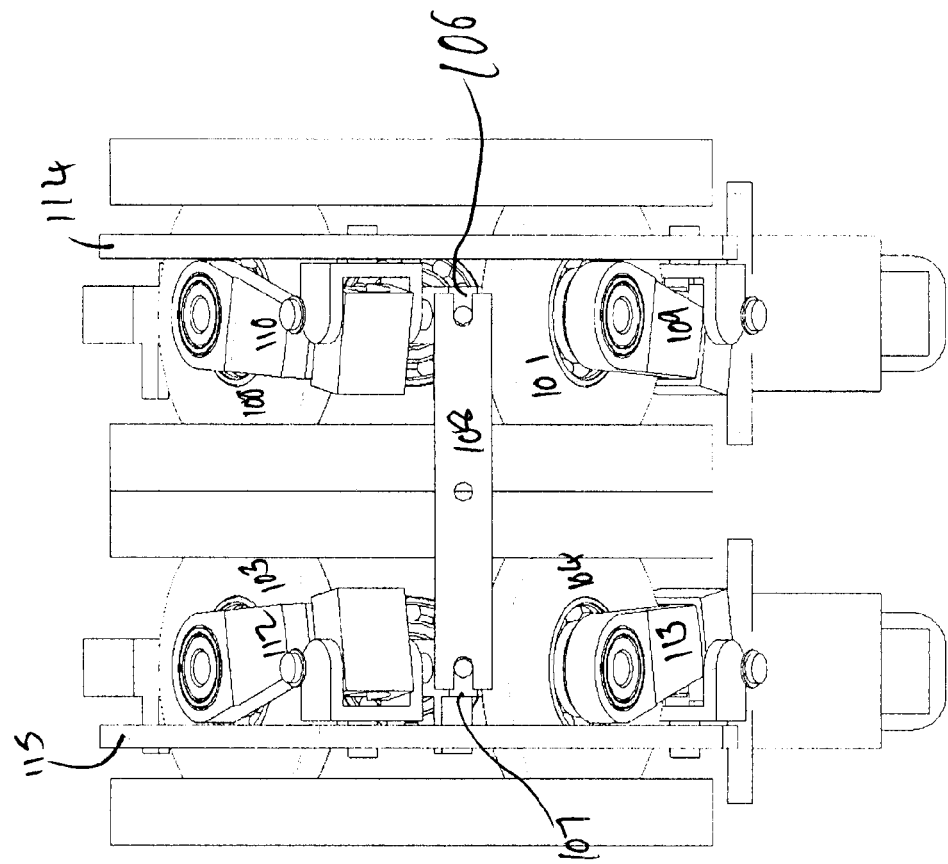
Figure 8B:
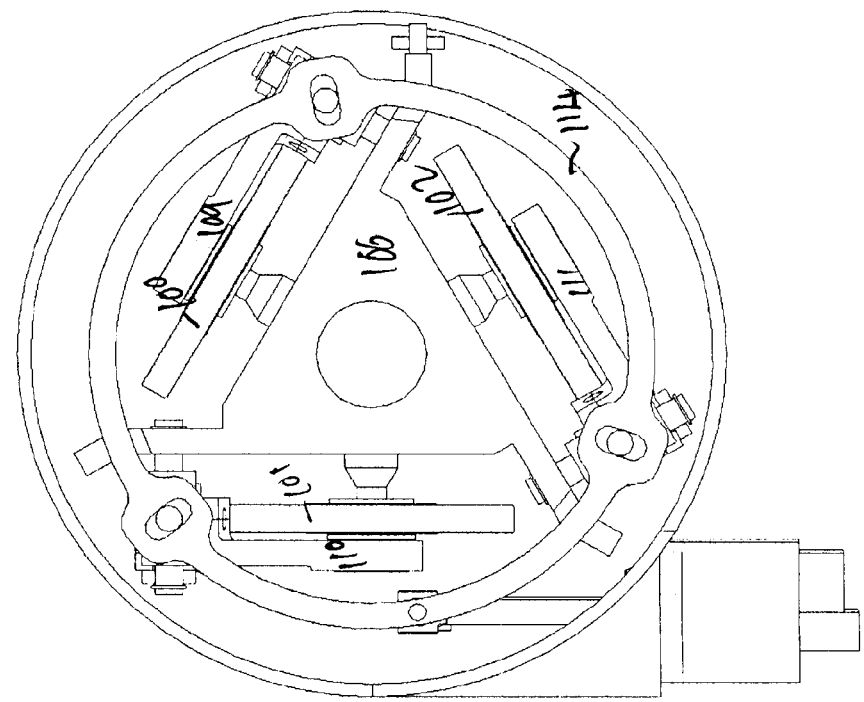

FIGS. 8a to 8c illustrate another embodiment of the invention showing a ratio-controlled variator comprising three rollers per cavity 100, 101, 102 and 103, 104 (and a further roller not shown) and a twin cavity arrangement. The variator comprises a control assembly having reaction members 106, 107 in each cavity operatively coupled to a linking lever 108 whereby load may be balanced, in a manner similar to that in the preceding embodiments. The reaction members 106, 107 are operatively coupled with the rollers such that reaction torque from the roller-disc contacts is reacted to the linking lever 108 through the reaction members 106, 107 whereby the reaction torque from each cavity is balanced. The roller carriages 109, 110, 111 and 112, 113, and a further carriage (not shown) are mounted for pivotal movement and may be actuated by control members 114 and 115.

What is claimed is:

1. A variator comprising:
   a first input surface and a first output surface defining a first toroidal cavity and being coaxially mounted for rotation about a variator axis and a first plurality of rollers in driving engagement with the first input and first output surfaces, wherein the first plurality of rollers includes three rollers;
   a second input surface and a second output surface defining a second toroidal cavity and being coaxially mounted for rotation about the variator axis and a second plurality of rollers in driving engagement with the second input and second output surfaces, wherein the second plurality of rollers includes three rollers; and
   a control assembly comprising a first roller carrier upon which the plurality of rollers in the first cavity are rotatably mounted and a second roller carrier upon which the plurality of rollers in the second cavity are rotatably mounted and which assembly is adapted to balance the reaction torque from the first cavity with the reaction torque from the second cavity, wherein the control assembly includes a linking lever configured to enable the reaction torque from the first cavity to be balanced with the reaction torque from the second cavity, wherein the linking lever is spaced in a radial direction from the variator axis and extends parallel to the variator axis from the first toroidal cavity to the second toroidal cavity, wherein the linking lever includes a pair of cutouts each at least partially defined by an arcuate surface that is located inwardly of an adjacent end of the linking lever, and wherein each of the pair of cutouts extends through the adjacent end of the linking lever.

2. The variator according to claim 1 wherein the control assembly between the rollers in the first cavity and the second cavity equalizes the reaction torque from the rollers in the first cavity with that from the rollers in the second cavity.

3. The variator according to claim 1, wherein the control assembly further comprises a mechanical linkage operatively coupled to the first and second roller carriers.

4. The variator according to claim 3, wherein the control assembly balances the reaction torque by causing the mechanical linkage to impart movement to the first roller carrier and the second roller carrier in a direction orthogonal to the line of action of the force applied by the first and second input and output surfaces to the first and second rollers.

5. The variator according to claim 1, comprising a control input for the rollers in the first toroidal cavity and/or the second toroidal cavity wherein the variator is ratio-controlled.

6. The variator according to claim 1, wherein each cavity of the variator includes a control member for effecting tilting of the rollers, and a separate reaction member for reacting loads from the rollers.

7. A variator comprising:
   a first input surface and a first output surface cooperatively defining a first toroidal cavity, wherein the first input surface and the first output surface are coaxially mounted for rotation about a variator axis;
   a first plurality of rollers arranged in the first toroidal cavity such that the first plurality of rollers are in driving engagement with the first input and output surfaces;
   a second input surface and a second output surface cooperatively defining a second toroidal cavity, wherein the second input surface and the second output surface are coaxially mounted for rotation about the variator axis;
   a second plurality of rollers arranged in the second toroidal cavity such that the second plurality of rollers are in driving engagement with the second input and output surfaces; and
   a control assembly including a first roller carrier upon which the first plurality of rollers are rotatably mounted and a second roller carrier upon which the second plurality of rollers are rotatably mounted, wherein the control assembly includes a linking lever configured to enable the reaction torque from the first cavity to be balanced with the reaction torque from the second cavity, wherein the linking lever is located radially outward of the variator axis and extends parallel to the variator axis from the first toroidal cavity to the second toroidal cavity, wherein the linking lever includes a pair of cutouts each at least partially defined by an arcuate surface that is located inwardly of an adjacent end of the linking lever, and wherein each of the cutouts is sized to receive a cylindrical post extending radially outward from one of the first and second toroidal cavities.

8. The variator of claim 7, wherein the linking lever includes a bar having a generally rectangular shape.

9. The variator of claim 8, wherein the pair of cutouts are formed in opposite ends of the linking lever.

10. The variator of claim 9, wherein each of the pair of cutouts extends through the adjacent end of the linking lever.

11. The variator of claim 7, wherein the first and second toroidal cavities are spaced from one another along the variator axis.

12. The variator of claim 7, wherein each of the first and second plurality of rollers includes three rollers.

13. A variator comprising:
   a first input surface and a first output surface cooperatively defining a first toroidal cavity, wherein the first input surface and the first output surface are coaxially mounted for rotation about a variator axis;

a first plurality of rollers arranged in the first toroidal cavity such that the first plurality of rollers are in driving engagement with the first input and output surfaces, wherein the first plurality of rollers includes three rollers;

a second input surface and a second output surface cooperatively defining a second toroidal cavity that is spaced from the first toroidal cavity along the variator axis, wherein the second input surface and the second output surface are coaxially mounted for rotation about the variator axis;

a second plurality of rollers arranged in the second toroidal cavity such that the second plurality of rollers are in driving engagement with the second input and output surfaces, wherein the second plurality of rollers includes three rollers; and a control assembly including a first roller carrier upon which the first plurality of rollers are rotatably mounted and a second roller carrier upon which the second plurality of rollers are rotatably mounted, wherein the control assembly includes a linking lever configured to enable the reaction torque from the first cavity to be balanced with the reaction torque from the second cavity, wherein the linking lever is radially spaced from the variator axis and extends parallel to the variator axis from the first toroidal cavity to the second toroidal cavity, wherein the linking lever includes a pair of cutouts each at least partially defined by an arcuate surface that is located inwardly of an adjacent end of the linking lever, and wherein each of the pair of cutouts extends through the adjacent end of the linking lever and is sized to receive a cylindrical post extending radially outward from one of the first and second toroidal cavities.

14. The variator of claim 13, wherein the linking lever includes a bar having a generally rectangular shape.

15. The variator of claim 14, wherein the pair of cutouts are formed in opposite ends of the bar.

* * * * *